(12) United States Patent
Charmot et al.

(10) Patent No.: US 6,919,409 B2
(45) Date of Patent: Jul. 19, 2005

(54) REMOVAL OF THE THIOCARBONYLTHIO OR THIOPHOSPHORYLTHIO END GROUP OF POLYMERS AND FURTHER FUNCTIONALIZATION THEREOF

(75) Inventors: Dominique Charmot, Campbell, CA (US); Marcelo Piotti, San Jose, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 16 days.

(21) Appl. No.: 10/609,255

(22) Filed: Jun. 26, 2003

(65) Prior Publication Data

US 2004/0266953 A1 Dec. 30, 2004

(51) Int. Cl.$^7$ .............................. C08F 2/38; C08F 4/04
(52) U.S. Cl. ..................... 525/259; 525/261; 525/263; 526/220; 526/222; 526/230
(58) Field of Search ............................. 525/259, 273, 525/350, 351, 263; 526/222, 224

(56) References Cited

U.S. PATENT DOCUMENTS

| | | | |
|---|---|---|---|
| 3,580,830 A | 5/1971 | Siebert ................... | 204/159.24 |
| 5,089,601 A | 2/1992 | Ozoe et al. ................ | 528/390 |
| 5,314,962 A | 5/1994 | Otsu et al. .................. | 525/280 |
| 5,356,947 A | 10/1994 | Ali et al. ..................... | 522/57 |
| 5,392,209 A | 2/1995 | Eason et al. ............ | 364/413.01 |
| 5,489,654 A | 2/1996 | Clouet ....................... | 525/398 |
| 5,511,186 A | 4/1996 | Carhart et al. .............. | 395/600 |
| 5,658,986 A | 8/1997 | Clouet ......................... | 525/88 |
| 5,866,047 A | 2/1999 | Nagino et al. .............. | 264/1.27 |
| 6,153,705 A | 11/2000 | Corpart et al. .............. | 525/244 |
| 6,380,335 B1 | 4/2002 | Charmot et al. ............ | 526/220 |
| 6,395,850 B1 | 5/2002 | Charmot et al. ............ | 526/220 |
| 6,482,909 B2 | 11/2002 | Charmot et al. ............ | 526/220 |
| 6,512,081 B1 | 1/2003 | Rizzardo et al. ............ | 528/340 |
| 6,518,364 B2 | 2/2003 | Charmot et al. ............ | 525/259 |
| 6,518,448 B2 | 2/2003 | Chang et al. ................ | 558/233 |
| 6,569,969 B2 | 5/2003 | Charmot et al. ............ | 526/220 |
| 6,667,376 B2 | 12/2003 | Charmot et al. ............ | 526/220 |
| 6,767,968 B1 | 7/2004 | Liu et al. .................... | 525/242 |
| 2002/0058770 A1 | 5/2002 | Charmot et al. ............ | 526/194 |
| 2002/0061990 A1 | 5/2002 | Charmot et al. ............ | 526/205 |
| 2003/0092834 A1 | 5/2003 | Charmot et al. ........... | 525/54.2 |
| 2003/0232938 A1 * | 12/2003 | Charmot et al. ............ | 526/194 |
| 2003/0232939 A1 | 12/2003 | Charmot et al. ......... | 526/218.1 |
| 2004/0019163 A1 | 1/2004 | Charmot et al. ............ | 526/198 |

FOREIGN PATENT DOCUMENTS

| | | | |
|---|---|---|---|
| EP | 0 349 232 | 1/1990 | ......... C08F/293/00 |
| EP | 0 421 149 | 4/1991 | ........... C08F/36/18 |
| EP | 0 449 619 | 10/1991 | .......... C09J/201/00 |
| WO | WO 98/10478 | 1/1998 | ............ C08F/2/38 |
| WO | WO 98/58974 | 12/1998 | ......... C08F/293/00 |
| WO | WO 99/05099 | 2/1999 | ......... C07C/327/36 |
| WO | WO 99/31144 | 6/1999 | ............ C08F/2/38 |
| WO | WO 99/33003 | 7/1999 | ........... G06F/17/30 |
| WO | WO 99/35177 | 7/1999 | ......... C08F/293/00 |
| WO | WO 00/75207 | 12/2000 | ......... C08F/293/00 |
| WO | WO 02/28932 | 4/2002 | ......... C08F/293/00 |
| WO | WO 02/090397 | 11/2002 | ............. C08F/8/00 |
| WO | WO 02/090409 | 11/2002 | ......... C08F/293/00 |

OTHER PUBLICATIONS

Afferent Systems, Inc., "What's new?, IRORI and Afferent enter into Combinatorial Chemistry Collaboration Agreement," pp. 1 of 2, http://www.afferent.com/news.html, Copyright© 1996–1999, Last updated Jul. 3, 1999.

Cargill, J.F., et al., *Lab. Rob. Autom.* 1996, 8, 139–148.

Castro et al., 1984, *J. Org. Chem* vol. 49: 863–866 "Kinetics and Mechanism of the Addition of Amines to Carbon Disulfide in Ethanol".

Charmot et al., *Macromolecular Symposia*, 2000, 150, 23–32.

Chaumont, P. et al., "Free–radical synthesis of functional polymers involving addition–fragmentation reactions" *ACS Symposium Series* (1998), 685, 362–376.

Colombani, D. et al., "Addition–fragmentation processes in free radical polymerization" *Progress in Polymer Science* (1996), 21(3), 439–503.

Colombani, D. et al., "Chain transfer by addition–substitution–fragmentation mechanism. I. End–functional polymers by a single–step free radical transfer reaction: use of a new allylic linear peroxyketal" *Journal of Polymer Science, Part A: Polymer Chemistry* (1994), 32(14), 2687–97.

Corkan, et al., "Experiment Manager Software for an Automated Chemistry Workstation, including a Scheduler for Parallel Experimentation," *Chemometrics and Intelligent Laboratory Systems: Laboratory Information Management*, 17 (1992) Oct., No. 1, 47–74, Elsevier Science Publishers B.V., Amsterdam.

Grigoriadis et al., *APHIL*, "A Relational System For Managing High–Throughput Screening Data," 1997.

Hansch et al., "Exploring QSAR—Hydrophobic, Electronic, and Steric Constants", ACS Professional Reference Book, 1995, pp. 327–348.

Houben–Weyl, *Methoden der organischen Chemie*, vol. XIV/1, Makromolekulare Stoffe, Georg–Thieme–Verlag, Stuttgart, 1961, pp 192–208.

Houben–Weyl, *Methoden der organischen Chemie*, vol. XIV/1, Makromolekulare Stoffe, Georg–Thieme–Verlag, Stuttgart, 1961, pp 411–420.

(Continued)

*Primary Examiner*—James J. Seidleck
*Assistant Examiner*—Olga Asinovsky

(57) ABSTRACT

A method of free radical polymerization and for cleaving a thio group from the resulting polymer is provided. The method comprises forming a mixture of one or more monomers, at least one free radical source and a chain transfer agent, wherein the chain transfer agent comprises a thio moiety. The mixture is polymerized, and the resulting polymer is mixed with a free radical source, and a monomer having little or no homopolymerizability under cleavage conditions. The thio moiety on the polymer is replaced with a group of interest.

38 Claims, No Drawings

OTHER PUBLICATIONS

Jiang, S. et al., "New chain transfer agents for radical polymerization based on the addition–fragmentation mechanism" *Macromol. Chem. Phys.* (1995), 196(7), 2349–60.

McFarland et al., "Approaches For Rapid Materials Discovery Using Combinatorial Methods", Matrice Technologies, Inc., 1998, 13.3 107–120.

MDL Information Systems, Inc., *MDL Screen 1.3 Closes Final Gap in HTS Workflow*, pp. 1–8 1998.

Meijs, G. et al., "Chain transfer by an addition–fragmentation mechanism—the use of alpha–benzyloxystyrene for the preparation of low–molecular–weight poly(methyl methacrylate) and polystyrene" *Makromolekulare Chemie, Rapid Communications* (1988), 9(8), 547–51.

Meijs, G. et al., "Preparation of controlled–molecular–weight, olefin–terminated polymers by free radical methods. Chain transfer using allylic sulfides" *Macromolecules* (1988), 21(10), 3122–4.

Moad et al., "The Chemistry of Free Radical Polymerization", Pergamon Press, (1995), pp. 176–183.

Monteiro et al., *Journal of Polymer Science: Part A: Polymer Chemistry*, 2000, vol. 38, 3864–3874.

Monteiro et al., *Journal of Polymer Science: Part A: Polymer Chemistry*, 2000, vol. 38, 4206–4217.

Network Science, "Introducing MDL Screen", http://www.netsci.org/Science/Screening/feature03.html. downloaded on Nov. 15, 2002.

Otsu et al., *Advances in Polymer Science*, 1998, vol.: 136, pp. 75–137.

Thayer, Ann M., *Business* 2000, 78(6), 19–32.

Watanabe, Y. et al., "Addition–fragmentation chain transfer in free radical styrene polymerization in the presence of 2,4–diphenyl–4–methyl–1–pentene" *Chemistry Letters* (1993), (7), 1089–92.

International Search Report and Written Opinion of the International Searching Authority (Laura Fernandez Gomez, European Patent Office) dated Sep. 14, 2004, Application No. PCT/US2004/010014.

\* cited by examiner

REMOVAL OF THE THIOCARBONYLTHIO OR THIOPHOSPHORYLTHIO END GROUP OF POLYMERS AND FURTHER FUNCTIONALIZATION THEREOF

FIELD OF THE INVENTION

This invention provides methods for removing moieties from the ends of polymers. More specifically, the invention provides methods for cleaving thiocarbonylthio or thiophosphorylthio moieties from the ends of polymers made by a reversible addition fragmentation transfer polymerization, wherein the chain transfer agents used for polymerization contain the moiety that is ultimately cleaved from the polymer.

BACKGROUND OF THE INVENTION

The use and mechanism of reversible chain transfer agents for free radical polymerization is now generally known and coined as RAFT (Reversible Addition Fragmentation Transfer), see, for example, U.S. Pat. No. 6,153,705, WO 98/01478, WO 99/35177, WO 99/31144, and WO 98/58974, each of which is incorporated herein by reference. Recently new agents have been disclosed which are readily available for polymerizing desired monomers under commercially acceptable conditions, which include high conversion at the shortest possible reaction times and lower temperatures, see, for example U.S. Pat. Nos. 6,380,335, 6,395,850, and 6,518,364, each of which is incorporated herein by reference. Dithio compounds used in RAFT polymerizations can provide material with the attributes of living polymerization, i.e. low molecular weight distribution and block architectures.

There are currently some limitations to polymers produced by the RAFT process using dithiocarbonylated or dithiophosphorylated chain transfer agents. For instance, the polymers may contain one or more functional groups, such as dithioester, dithiocarbonate, dithiocarbazate, or dithiocarbamate, which absorb in the visible light. The appearance potentially limits the polymer's potential applications to such areas as electronics, which may require a transparent material. In some cases the dithio compound might be unstable under the conditions of use, or might degrade upon aging, and generate some unwanted effects such as odor, discoloration, etc.

WO 02/090397 discusses a method of radical reduction of dithiocarbonyl or dithiophosphoryl groups using a free radical initiator and a compound bearing a labile hydrogen atom. The method disclosed essentially removes the unwanted group from the polymer chain end and replaces it with a hydrogen atom. It does not disclose or teach any other methods for removing unwanted groups from the end of a polymer chain, or replacing those moieties with anything other than hydrogen. The use of a hydrogen labile compound may be undesirable in some circumstances, such as when those compounds are mercaptans, notoriously odoriferous, or alcohols, which may be non-solvents of the polymers.

In addition, copending U.S. patent application Ser. No. 10/407,405, entitled "Cleaving and Replacing Thio Control Agent Moieties from Polymers made by Living-Type Free Radical Polymerization" filed on Apr. 3, 2003, (attorney docket number 2000-089CIP3) the disclosure of which is herein incorporated by reference in its entirety, focuses on the replacement of the thiocarbonylthio or thiophosphorylthio groups with an alkyl group that is the result of the fragmentation of a free radical initiator, for example, from lauroyl peroxide or AIBN, or an addition-fragmentation chain transfer agent. In this case, a radical formed by the thermal fragmentation of the initiator adds to the chain transfer agent, which liberates the polymer radical via fragmentation. The polymer radical then combines with another alkyl radical present in the medium to yield the thio moiety free polymer. This is an efficient method to remove a thio moiety from polymers such as polymethacrylates, but its application to some polymers, such as polyacrylates is limited, since a comparatively higher energy radical is needed in order to induce the cleavage of the thio moiety-polymer bond.

Thus, what is needed is a method for removing certain groups from a chain end of a wide variety of polymers and replacing them with other groups.

SUMMARY OF THE INVENTION

This invention provides a method for removing unwanted groups from a chain end of a polymer and replacing them with a more desirable group.

This invention provides a method of free radical polymerization. The method comprises forming a mixture of one or more monomers, at least one free radical source and a chain transfer agent, wherein the chain transfer agent comprises a thiocarbonylthio group, subjecting the mixture to polymerization conditions, wherein a resulting polymer comprises one or more thiocarbonylthio groups, contacting the resulting polymer with a free radical source and a monomer with little to no homopolymerizability under cleavage reaction conditions, and activating the free radical source to generate radicals, wherein at least 50% of the thio groups are replaced with a group of interest other than hydrogen.

In general, the chain transfer agents described in this invention can be characterized by the general formula:

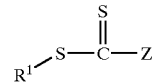

wherein $R^1$ is generally any group that is sufficiently labile to be expelled as its free radical form and Z is any group that activates the C=S double bond towards a reversible free radical addition fragmentation reaction. In other embodiments, Z is attached to C=S through a carbon atom (dithioesters), a nitrogen atom (dithiocarbamate), a sulfur atom (trithiocarbonate) or an oxygen atom (dithiocarbonate). Specific examples for Z can be found in WO98/01478, WO99/35177, WO99/31144, and WO98/58974, each of which is incorporated herein by reference. In some embodiments, Z is selected from the group consisting of hydrocarbyl, substituted hydrocarbyl, heteroatom-containing hydrocarbyl, substituted heteroatom-containing hydrocarbyl, and combinations thereof. More specifically, Z may be selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl, amino and alkoxy.

One aspect of this invention is directed toward methods for end-functionalizing polymers produced by a RAFT process while eliminating unwanted moieties, such as sulfur moieties at one or more termini. The method comprises exposing the polymer to an external radical source and activating the free radical source, in the presence of a monomer with little or no homopolymerizability. The activated external free radicals combine with the monomer and cleave the unwanted moiety from the polymer and cap the polymer with a more desirable moiety via a free radical process.

In one embodiment, the method comprises contacting a polymer produced by a RAFT process and having at least one chain end linked to a thio moiety, with a free radical initiator, in the presence of a monomer with little or no homopolymerizability, activating the free radical initiator to generate radicals that combine with the monomer, resulting in cleaving the thio moiety off the polymer chain end, and replacing the cleaved thio moiety with a group of interest, e.g., the monomer-initiator or initiator radical.

Further aspects of this invention will be evident to those of skill in the art upon review of this specification.

DETAILED DESCRIPTION OF THE INVENTION

This invention describes compounds and chain transfer agents useful for the control of free radical polymerization reactions, and compounds useful for removing portions of the chain transfer agents from the ends of the resulting polymers. In general, a free radical polymerization is carried out with these chain transfer agents by creating a mixture of at least one polymerizable monomer, the chain transfer agent and optionally at least one source of free radicals, e.g., an initiator. The source of free radicals is optional because some monomers may self-initiate upon heating. After or upon forming the polymerization mixture, the mixture is subjected to polymerization conditions. Polymerization conditions are those conditions that cause the at least one monomer to form at least one polymer, as discussed herein, such as temperature, pressure, atmosphere, ratios of starting components used in the polymerization mixture, reaction time or external stimuli of the polymerization mixture. After polymerization, cleavage of some or all of the thio portions of the chain transfer agents from the resulting polymers is carried out with the cleavage materials by creating a mixture of the polymer and the cleavage materials. After or upon forming the cleavage mixture, the mixture is subjected to cleavage conditions. Cleavage conditions are those conditions that cause some or all of the dithio moieties of the chain transfer agents to be cleaved from the ends of the polymer, as discussed herein, such as temperature, pressure, atmosphere, ratios of components used in the cleavage mixture, reaction time or external stimuli of the cleavage mixture. After cleavage, the remaining polymer radical can be capped in one of several ways.

In describing and claiming the present invention, the following terminology will be used in accordance with the definitions set out below. A named R group will generally have the structure that is recognized in the art as corresponding to R groups having that name. For the purposes of illustration, representative R groups as enumerated above are defined herein. These definitions are intended to supplement and illustrate, not preclude, the definitions known to those of skill in the art.

It is also to be understood that the terminology used herein is for the purpose of describing particular embodiments only, and is not intended to be limiting. As used in this specification and the appended claims, the singular forms "a," "an" and "the" include plural referents unless the context clearly dictates otherwise. In describing and claiming the present invention, the following terminology will be used in accordance with the definitions set out below.

The following definitions pertain to chemical structures, molecular segments and substituents:

As used herein, the phrase "having the structure" is not intended to be limiting and is used in the same way that the term "comprising" is commonly used. The term "independently selected from the group consisting of" is used herein to indicate that the recited elements, e.g., R groups or the like, can be identical or different (e.g., $R^2$ and $R^3$ in the structure of formula (1) may all be substituted alkyl groups, or $R^2$ may be hydrido and $R^3$ may be methyl, etc.).

"Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of one to six carbon atoms, preferably one to four carbon atoms. "Substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkenyl" as used herein refers to a branched or unbranched hydrocarbon group typically although not necessarily containing 2 to about 24 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. The term "lower alkenyl" intends an alkenyl group of two to six carbon atoms, preferably two to four carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 24 carbon atoms and at least one triple bond, such as ethynyl, n-propynyl, isopropynyl, n-butynyl, isobutynyl, octynyl, decynyl, and the like. Generally, although again not necessarily, alkynyl groups herein contain 2 to about 12 carbon atoms. The term "lower alkynyl" intends an alkynyl group of two to six carbon atoms, preferably three or four carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing one to six, more preferably one to four, carbon atoms. The term "aryloxy" is used in a similar fashion, with aryl as defined below.

Similarly, the term "alkyl thio" as used herein intends an alkyl group bound through a single, terminal thioether linkage; that is, an "alkyl thio" group may be represented as —S-alkyl where alkyl is as defined above. A "lower alkyl thio" group intends an alkyl thio group containing one to six, more preferably one to four, carbon atoms.

The term "allenyl" is used herein in the conventional sense to refer to a molecular segment having the structure —CH=C=CH$_2$. An "allenyl" group may be unsubstituted or substituted with one or more non-hydrogen substituents.

The term "aryl" as used herein, and unless otherwise specified, refers to an aromatic substituent containing a single aromatic ring or multiple aromatic rings that are fused together, linked covalently, or linked to a common group such as a methylene or ethylene moiety. The common linking group may also be a carbonyl as in benzophenone, an oxygen atom as in diphenylether, or a nitrogen atom as in diphenylamine. Preferred aryl groups contain one aromatic ring or two fused or linked aromatic rings, e.g., phenyl, naphthyl, biphenyl, diphenylether, diphenylamine, benzophenone, and the like. In particular embodiments, aryl substituents have 1 to about 200 carbon atoms, typically 1 to about 50 carbon atoms, and preferably 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent.

The terms "halo" and "halogen" are used in the conventional sense to refer to a chloro, bromo, fluoro or iodo substituent. The terms "haloalkyl," "haloalkenyl" or "haloalkynyl" (or "halogenated alkyl," "halogenated alkenyl," or "halogenated alkynyl") refers to an alkyl, alkenyl or alkynyl group, respectively, in which at least one of the hydrogen atoms in the group has been replaced with a halogen atom.

The term "heteroatom-containing" as in a "heteroatom-containing hydrocarbyl group" refers to a molecule or molecular fragment in which one or more carbon atoms is replaced with an atom other than carbon, e.g., nitrogen, oxygen, sulfur, phosphorus or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl."

"Hydrocarbyl" refers to univalent hydrocarbyl radicals containing 1 to about 30 carbon atoms, preferably 1 to about 24 carbon atoms, most preferably 1 to about 12 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, preferably one to four carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," "substituted alkenyl" and the like, as alluded to in some of the aforementioned definitions, is meant that in the hydrocarbyl, hydrocarbylene, alkyl, alkenyl or other moiety, at least one hydrogen atom bound to a carbon atom is replaced with one or more substituents that are groups such as hydroxyl, alkoxy, thio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl."

As used herein the term "silyl" refers to the —SiZ$^1$Z$^2$Z$^3$ radical, where each of Z$^1$, Z$^2$, and Z$^3$ is independently selected from the group consisting of hydrido and optionally substituted alkyl, alkenyl, alkynyl, aryl, aralkyl, alkaryl, heterocyclic, alkoxy, aryloxy and amino.

As used herein, the term "phosphino" refers to the group —PZ$^1$Z$^2$, where each of Z$^1$ and Z$^2$ is independently selected from the group consisting of hydrido and optionally substituted alkyl, alkenyl, alkynyl, aryl, aralkyl, alkaryl, heterocyclic and amino.

The term "amino" is used herein to refer to the group —NZ$^1$Z$^2$, where each of Z$^1$ and Z$^2$ is independently selected from the group consisting of hydrido and optionally substituted alkyl, alkenyl, alkynyl, aryl, aralkyl, alkaryl and heterocyclic.

The term "thio" is used herein to refer to the group —SZ$^1$, where Z$^1$ is selected from the group consisting of hydrido and optionally substituted alkyl, alkenyl, alkynyl, aryl, aralkyl, alkaryl and heterocyclic.

As used herein all reference to the elements and groups of the Periodic Table of the Elements is to the version of the table published by the Handbook of Chemistry and Physics, CRC Press, 1995, which sets forth the new IUPAC system for numbering groups.

Polymerization of the monomers can be conducted according to conventional methods such as bulk polymerization or in a solvent, or in emulsion by batch or semi-continuous or continuous polymerization. For example, the polymer can be obtained by dissolving requisite monomers in an organic solvent, then conducting a polymerization reaction in the presence of a polymerization initiator, such as an azo compound. Use of a chain transfer agent (CTA) during the polymerization process can be advantageous.

Organic solvents suitable for polymerization reactions of the invention include, for example, ketones, ethers, polar aprotic solvents, esters, aromatic solvents and aliphatic hydrocarbons, both linear and cyclic. Exemplary ketones include methyl ethyl ketone (2-butanone) (MEK), acetone and the like. Exemplary ethers include alkoxyalkyl ethers, such as methoxy methyl ether or ethyl ether, tetrahydrofuran, 1,4 dioxane and the like. Polar aprotic solvents include dimethyl formamide, dimethyl sulfoxide and the like. Suitable esters include alkyl acetates, such as ethyl acetate, methyl acetate and the like. Aromatic solvents include alkylaryl solvents, such as toluene, xylene and the like and halogenated aromatics such as chlorobenzene and the like. Hydrocarbon type solvents include, for example, hexane, cyclohexane and the like.

Typically, the polymerization reaction is conducted in a manner such that the concentration of monomers is about 5 to 95% in the solvent by weight. In other words, the reactions are run between about 5% and about 95% percentage solids, preferably between about 20% and about 80% percent solids, and in particular, The polymerization conditions that may be used include temperatures for polymerization typically in the range of from about 20° C. to about 110° C., more preferably in the range of from about 50° C. to about 90° C. and even more preferably in the range of from about 60° C. to about 80° C. The atmosphere may be controlled, with an inert atmosphere being preferred, such as nitrogen or argon. The molecular weight of the polymer is controlled via adjusting the ratio of monomer to chain transfer agent. Generally, the molar ratio of monomer to chain transfer agent is in the range of from about 5:1 to about 5000:1, more preferably in the range of from about 10:1 to about 2000:1, and most preferably from 10:1 to about 1500:1.

A free radical source is provided in the polymerization mixture, which can stem from spontaneous free radical generation upon heating or preferably from a free radical initiator. In the latter case the initiator is added to the polymerization mixture at a concentration high enough to achieve an acceptable polymerization rate (e.g., commercially significant conversion in a certain period of time, such as listed below). Conversely, a too high free radical initiator to chain transfer agent ratio will favor unwanted dead polymer formation through radical-radical coupling reaction leading to polymer materials with uncontrolled characteristics. The molar ratio of free radical initiator to chain transfer agent for polymerization are typically in the range of from about 2:1 to about 0.02:1.

The phrase "free-radical source," within the context of the invention, refers broadly to any and all compounds or mixtures of compounds that can lead to the formation of radical species under appropriate working conditions (thermal activation, irradiation, interaction with a reductant, etc.).

Polymerization conditions also include the time for reaction, which may be from about 0.5 hours to about 72 hours, specifically in the range of from about 1 hour to about 24 hours, more specifically in the range of from about 2 hours to about 12 hours. In semi-continuous or continuous polymerization modes, time for reaction can include feed times. Conversion of monomer to polymer is at least about 50%, more specifically at least about 75% and most specifically at least about 85%.

The polymerization process generally proceeds in a "living" type manner. Thus, generally an approximately linear relationship between conversion and number average molecular weight can be observed, although this is not a pre-requisite. In some embodiments, the living character manifests itself by the ability to prepare block copolymers: hence, a polymer chain is first grown with monomer A, and then, when monomer A is depleted, monomer B is added to extend the first block of polymer A with a second block of polymer B. Thus, in some instances, particularly when the chain transfer constant of the chain transfer agent, Ct, is low (Ct being defined as the ratio of the transfer rate coefficient to the propagation rate constant), e.g., Ct less than 2, the molecular weight to conversion plot might not exhibit a linear trend: this does not preclude however that block copolymer formation did not occur. Block copolymer formation through a living process can be demonstrated using analytical techniques such as polymer fractionation with selective solvent (of polymer A, polymer B, respectively), gradient elution chromatography and/or 2-dimensional chromatography. Block copolymers tend to microphase-separate and organize in a variety of morphologies that can be probed by physical techniques such as X-ray diffraction, dynamic mechanical testing, and the like. Homopolymers and random copolymers resulting from copolymerization of different monomers either in a batch, semi-continuous or continuous mode are also within the scope of this invention.

The polymers of the invention can, in the general case, be linear or non-linear, and can be homopolymers or copolymers. The non-linear polymers of the invention can have a number of architectures, including for example star-polymers, branched polymers, graft polymers, semi-cross-linked polymers, and combinations thereof, among others. These various polymer architectures are achieved with a high degree of control by the polymer preparation methods of the invention.

Initiators, as discussed above, may be optional. When present, initiators useful in the polymerization mixture and the inventive process are known in the art, and can be a commercially available free-radical initiator. In some embodiments, initiators having a short half-life at the polymerization temperature are utilized in particular. Such initiators are utilized because the speed of the initiation process can affect the polydispersity index of the resulting polymer. That is, the kinetics of controlled, living polymerization are such that less polydisperse polymer samples are prepared if initiation of all chains occurs at substantially the same time. More specifically, suitable free radical initiators include any thermal, redox or photo initiators, including, for example, alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, peracids, percarbonates, alkyl peroxalates, alkylperoxidicarbonates, alkyl ketone peroxides, persulphates, azo compounds and halide compounds. Specific initiators include cumene hydroperoxide (CHP), t-butyl hydroperoxide (TBHP), t-butyl perbenzoate (TBPB), sodium carbonateperoxide, benzoyl peroxide (BPO), lauroyl peroxide (LPO), methylethylketone peroxide 45%, potasium persulfate, ammonium persulfate, 2,2-azobis(2,4-dimethyl-valeronitrile) (VAZO®-65), 1,1-azobis(cyclo-hexanecarbonitrile) (VAZO®-40), 2,2-azobis (N,N'-dimethyleneisobutyramidine) dihydrochloride (VAZO®-044), 2,2-azobis(2-amidino-propane) dihydrochloride (VAZO®-50) and 2,2-azobis(2-amido-propane) dihydrochloride. Redox pairs such as N,N-dimethylaniline/acyl peroxide, persulfate/TEMED, persulfate/sulfite and Fe($2^+$)/peroxide are also useful. Initiation may also be by heat or UV light, as is known in the art, depending on the embodiment being practiced (e.g., UV light may be used for the modified initiator or RAFT or MADIX techniques discussed herein). Those of skill in the art can select a proper initiator within the scope of this invention.

In some embodiments, monomers that may be polymerized using the methods of this invention (and from which M, below, may be derived) include at least one monomer that is selected from the group consisting of styrene, substituted styrene, alkyl acrylate, substituted alkyl acrylate, alkyl methacrylate, substituted alkyl methacrylate, acrylonitrile, methacrylonitrile, acrylamide, butylacrylate, methacrylamide, N-alkylacrylamide, N-alkylmethacrylamide, N,N-dialkylacrylamide, N,N-dialkylmethacrylamide, isoprene, butadiene, ethylene, vinyl acetate and combinations thereof. Functionalized versions of these monomers may also be used. Specific monomers or comonomers that may be used in this invention include butylacrylate, 6-[5-hydroxynorbornane-2-carboxylic acid lactone] acrylate, 2-[2-ethyladamantyl] acrylate, 1-[3-hydroxyadamantyl] acrylate, methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, α-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, 4-acryloylmorpholine, vinyl benzoic acid (all isomers), diethylaminostyrene (all isomers), α-methylvinyl benzoic acid (all isomers), diethylamino α-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenylmaleimide, N-butylmaleimide, butadiene, isoprene, chloroprene, ethylene, vinyl acetate, and combinations thereof.

It should be understood that combinations of all monomers (and monomeric units derived from polymers presented herein) are within the scope of the invention.

Typically, two or more of the above-identified monomers are polymerized in either a batch process, continuous or a semi-continuous feed process.

Chain transfer agents (CTAs) are known in the art and are used to help control polymer molecular weight. Ultimately, many different types of CTAs can be incorporated into the terminus of a polymer as further explained below. Examples of suitable CTAs useful in the present invention include those described in U.S. Pat. No. 6,512,021, WO98/01478, WO99/35177, WO99/31144, WO99/05099 and WO98/58974, each of which is incorporated herein by reference.

Additional examples include CTAs described in U.S. Pat. Nos. 6,395,850, 6,518,364, and U.S. patent application Ser. No. 10/104,740, filed Mar. 22, 2002, the teachings of which are incorporated herein by reference in their entirety.

In general, CTAs useful in the present invention have the general formula (I):

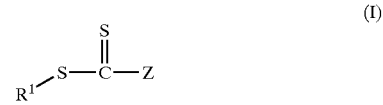

wherein $R^1$ is generally any group that is sufficiently labile to be expelled as its free radical form, and Z is any group that activates the C=S double bond towards a reversible free radical addition fragmentation reaction. In other embodiments, Z is attached to C=S through a carbon atom (dithioesters), a nitrogen atom (dithiocarbamate), a sulfur atom (trithiocarbonate) or an oxygen atom (dithiocarbonate). Specific examples for Z can be found in WO98/01478, WO99/35177, WO99/31144, and WO98/58974, each of which is incorporated herein by reference. In some embodiments, Z is selected from the group consisting of hydrocarbyl, substituted hydrocarbyl, heteroatom-containing hydrocarbyl, substituted heteroatom-containing hydrocarbyl, and combinations thereof. More specifically, Z may be selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl, amino and alkoxy.

In other embodiments, the chain transfer agents described in this invention can have a phosphorous atom in place of the carbon atom and be characterized by the general formula:

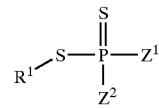

wherein $R^1$ is as described above, and $Z^1$ and $Z^2$ are each independently selected from the group defined for Z.

More specifically, in some embodiments the chain transfer agents may contain at least one $N^1$-$N^2$ bond covalently bonded to a thiocarbonyl group. In structural terms, the following moiety may be present in the chain transfer agents of this invention:

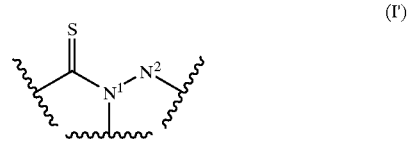

In some embodiments, a sulfur atom is attached to the thiocarbonyl group, leading to a dithiocarbonyl moiety. This may be referred to herein as the "dithiocarbazate" group or N—NC(=S)S moiety, however, such terminology is not intended to be limiting. Also, in some embodiments, the substituents of $N^2$ (other than $N^1$) form a heterocycle that includes $N^2$.

In particular, suitable CTAs useful in the present invention include those identified in U.S. Pat. No. 6,380,335, the contents of which are incorporated by reference. More specifically, CTAs of particular interest in combination with the monomers utilized throughout the specification can be characterized by the general formula (I"):

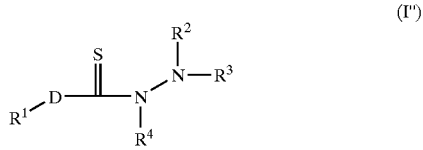

(I")

wherein D is S, Te or Se. In one aspect, D is sulfur. $R^1$ is generally any group that can be easily expelled under its free radical form ($R^{1\cdot}$) upon an addition-fragmentation reaction, as depicted below in Scheme 1 (showing D as S):

Scheme 1

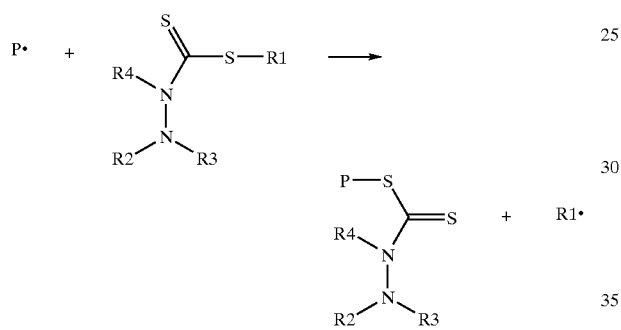

In Scheme 1, P• is a free radical, typically a macroradical, such as polymer chain. More specifically, $R^1$ is selected from the group consisting of hydrocarbyl, substituted hydrocarbyl, heteroatom-containing hydrocarbyl, and substituted heteroatom-containing hydrocarbyl, and combinations thereof. Even more specifically, $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains. And still more specifically, $R^1$ is selected from the group consisting of —CH$_2$Ph, —CH(CH$_3$)CO$_2$CH$_2$CH$_3$, —CH(CO$_2$CH$_2$CH$_3$)$_2$, —C(CH$_3$)$_2$CN, —CH(Ph)CN, —C(CH$_3$)$_2$CO$_2$R (alkyl, aryl, etc.) and —C(CH$_3$)$_2$Ph.

Also, $R^2$ and $R^3$ of the CTA are each independently selected from the group consisting of hydrogen, hydrocarbyl, substituted hydrocarbyl, heteroatom-containing hydrocarbyl, and substituted heteroatom-containing hydrocarbyl, and combinations thereof. More specifically, $R^2$ and $R^3$ can be each independently selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl. Specific embodiments of $R^2$ and/or $R^3$ are listed in the above definitions, and in addition include perfluorenated aromatic rings, such as perfluorophenyl. Also optionally, $R^2$ and $R^3$ can together form a double bond alkenyl moiety off the nitrogen atom, and in that case $R^2$ and $R^3$ are together optionally substituted alkenyl moieties.

Finally, $R^4$ of the CTA is selected from the group consisting of hydrogen, hydrocarbyl, substituted hydrocarbyl, heteroatom-containing hydrocarbyl, and substituted heteroatom-containing hydrocarbyl, and combinations thereof; and optionally, $R^4$ combines with $R^2$ and/or $R^3$ to form a ring structure, with said ring having from 3 to 50 non-hydrogen atoms. In particular, $R^4$ is selected from the group consisting of hydrogen, optionally substituted alkyl, optionally substituted aryl, optionally substituted alkenyl, optionally substituted acyl, optionally substituted aryl, amino, thio, optionally substituted aryloxy and optionally substituted alkoxy. Specific $R^4$ groups include methyl and phenyl.

In certain embodiments, $R^4$ combines with either $R^2$ or $R^3$ to form a substituted or unsubstituted pyrazole moiety. Exemplary CTAs include:

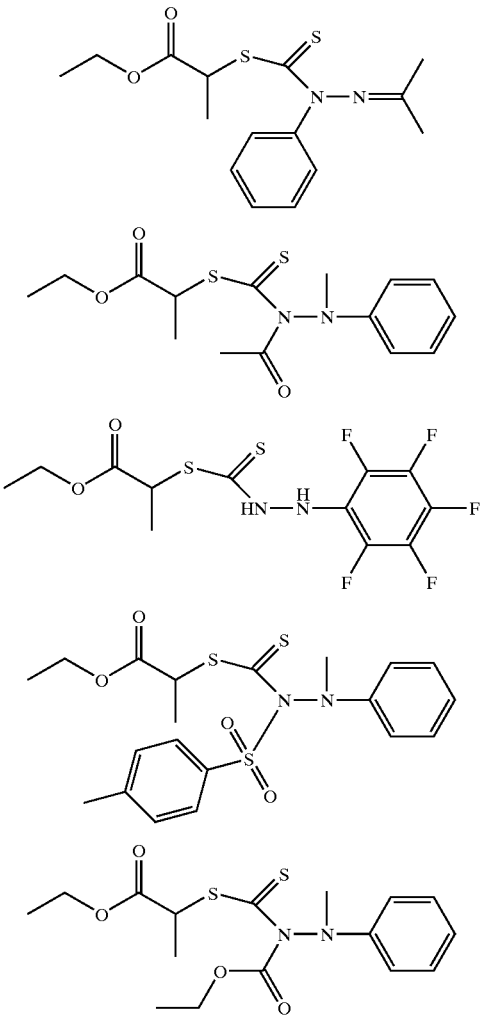

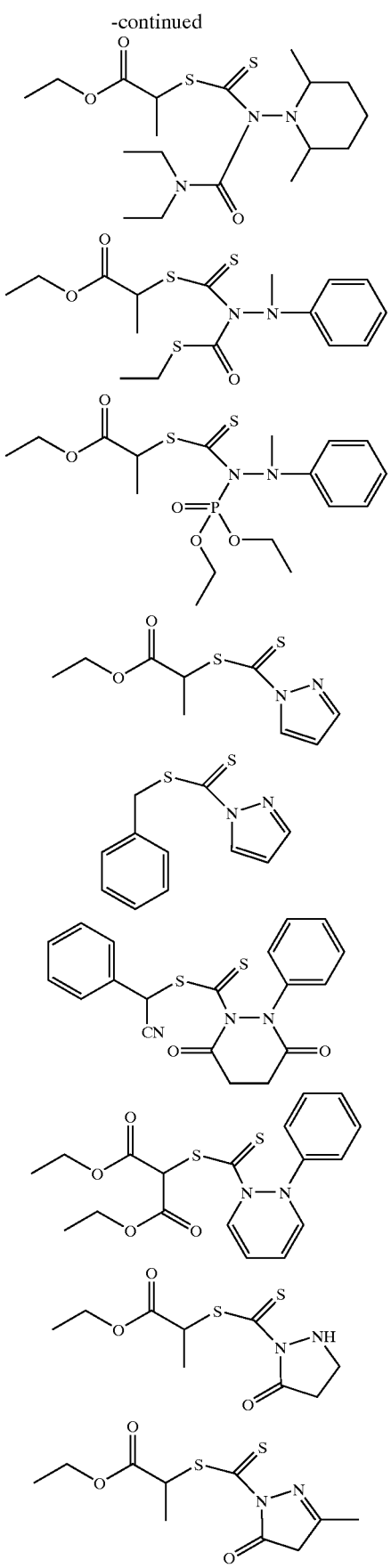

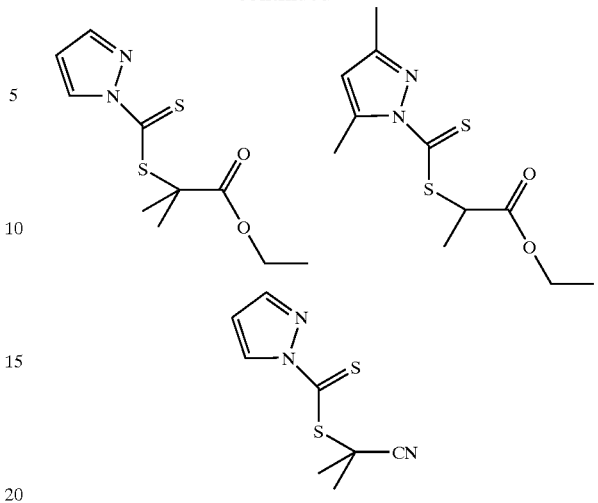

The CTAs are synthesized, generally, by methods known to those of skill in the art as described, for example in U.S. Pat. No. 6,380,335, which is hereby incorporated by reference in its entirety.

The polymers formed with the chain transfer agents described herein are believed to be grown via a degenerative transfer mechanism. Thus, upon analysis of the obtained polymers, monomers might appear between the $R^1$—S bond, and any of the above formulas can be rewritten in a polymeric form. For example, the polymers may be characterized by the general formula (II):

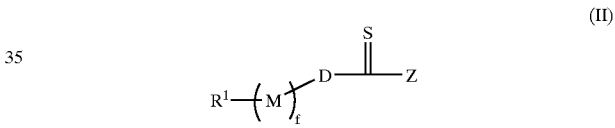

(II)

wherein M is a monomer or mixture of monomers or at least 2 blocks of different monomer (any from the above lists) and f is the degree of polymerization, and D, $R^1$, and Z are as defined above.

For the more specific embodiment, the polymers may be characterized by the general formula (II'):

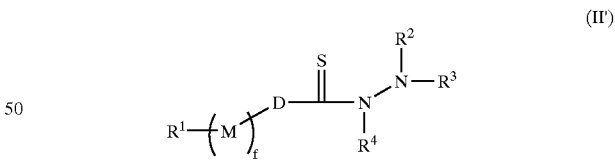

(II')

wherein M is a monomer or mixture of monomers or at least 2 blocks of different monomer (any from the above lists) and f is the degree of polymerization, and D, $R^1$, $R^2$, $R^3$ and $R^4$ are as defined above.

As used herein, "block copolymer" refers to a polymer comprising at least two segments of differing composition; having any one of a number of different architectures, where the monomers are not incorporated into the polymer architecture in a solely statistical or uncontrolled manner. Although there may be three, four or more monomers in a single block-type polymer architecture, it will still be referred to herein as a block copolymer. In some embodiments, the block copolymer will have an A-B architecture (with "A" and "B" representing the monomers).

Other architectures included within the definition of block copolymer include A-B-A, A-B-A-B, A-B-C, A-B-C-A, A-B-C-A-B, A-B-C-B, A-B-A-C (with "C" representing a third monomer), and other combinations that will be obvious to those of skill in the art. Block copolymers can be prepared a number of ways, including sequential addition of monomers or using multi-functional chain transfer agents described in U.S. Pat. No. 6,380,335, the contents of which are incorporated by reference. Of course with multifunctional chain transfer agents, the chain transfer agent may form a linking group between one or more blocks of the copolymers.

In one embodiment, the polymers of this invention include block copolymers having one or more blocks of random copolymer together with one or more blocks of single monomers. Thus, a polymer architecture of A-R, A-R-B, A-B-R, A-R-B-R-C, etc. is included herein, where R is a random block of monomers A and B or of monomers B and C. Moreover, the random block can vary in composition or size with respect to the overall block copolymer. In some embodiments, for example, the random block R will account for between 5 and 80% by weight of the mass of the block copolymer. In other embodiments, the random block R will account for more or less of the mass of the block copolymer, depending on the application. Furthermore, the random block may have a compositional gradient of one monomer to the other (e.g., A:B) that varies across the random block in an algorithmic fashion, with such algorithm being either linear having a desired slope, exponential having a desired exponent (such as a number from 0.1–5) or logarithmic. The random block may be subject to the same kinetic effects, such as composition drift, that would be present in any other radical copolymerization and its composition, and size may be affected by such kinetics, such as Markov kinetics. Any of the monomers listed elsewhere in this specification may be used in the block copolymers of these embodiments.

A "block" within the scope of the block copolymer embodiments of this invention typically comprises about 10 or more monomers of a single type (with the random blocks being defined by composition and/or weight percent, as described above). In some embodiments, the number of monomers within a single block is about 15 or more, about 20 or more or about 50 or more. However, in an alternative embodiment, block copolymers of this invention include blocks where a block is defined as two or more monomers that are not represented elsewhere in the copolymer. This definition is intended to encompass adding small amounts of a second monomer at one or both ends of a substantially homopolymeric polymer. In this alternative embodiment, the same copolymer architectures discussed above apply. This definition is therefore intended to include telechelic polymers, which include one or more functional end groups capable of reacting with other molecules. Thus, generally, a telechelic polymer is a block copolymer with in the definitions of this invention. The groups present at one or both ends of a telechelic polymer may be those known to those of skill in the art, including, for example, hydroxide, aldehyde, carboxylic acid or carboxylate, halogen, amine and the like, which have the ability to associate or form bonds with another molecule. Likewise, the block copolymer embodiments of the invention are intended to encompass telechelic polymers containing bifunctional groups, such as allyl-terminated or vinyl-terminated telechelics, sometimes referred to as macromonomers or macromers because of their ability to participate in polymerization reactions through the terminal group.

Combining the above embodiments provides a particularly powerful method of designing polymers. For example, the polymer may be a block copolymer having the architecture F-A-B-F, where F represents functional groups that may be the same or different within a single F-A-B-F structure (which, therefore, may encompass F-A-B-F'). Other polymer architectures within the scope of this invention include A-R-B-F and F-A-R-B-F. Other architectures will be apparent to those of skill in the art upon review of this specification—indeed, without wishing to be bound by any particular theory—it is the living nature of the emulsions of this invention that provide the ability to even make these polymers.

In one embodiment, block copolymers are assembled by the sequential addition of different monomers or monomer mixtures to living polymerization reactions. In another embodiment, the addition of a pre-assembled functionalized block (such as a telechelic oligomer or polymer) to a living free radical polymerization mixture yields a block copolymer. Ideally, the growth of each block occurs to high conversion. Conversions can be determined by size exclusion chromatography (SEC) via integration of polymer to monomer peak. For UV detection, the polymer response factor must be determined for each polymer/monomer polymerization mixture. Conversions can also be determined by use of NRM or Raman spectroscopy. Typical conversions can be 50% to 100% for each block. Intermediate conversion can lead to block copolymers with a random copolymer block separating the two or more homopolymer blocks, depending on the relative rates of polymerization and monomer addition. At high conversion, the size of this random block is sufficiently small such that it is less likely to affect polymer properties such as phase separation, thermal behavior and mechanical modulus. This fact can be intentionally exploited to improve polymerization times for many applications without measurably affecting the performance characteristics of the resulting polymer. This is achieved by intentionally "killing" or terminating the living nature of the polymerization when a desired level of conversion (e.g., >80%) is reached by neutralizing the chain transfer agent, for example by introducing acids, bases, oxidizing agents, reducing agents, radical sources, scavengers, etc. In the absence of chain transfer agent, the polymerization continues uncontrolled (typically at much higher reaction rates) until the remaining monomer is consumed. Polymers can also be created by grafting monomers, monomer mixtures, oligomers or polymers onto polymers having multiple available functional groups.

In other embodiments, polymers can be prepared by grafting processes, preparation of telechelic polymers, preparation of macromonomers, etc. In these embodiments, at least one polymer segment is derived from a living or controlled process of the invention, while other segments can be derived from any polymerization process, including, for example, controlled or uncontrolled radical polymerization, condensation polymerization, Ziegler-Natta and related processes, Ring-Opening Metathesis Polymerization, ionic polymerization, surface modification or grafting, or other addition or step-growth processes.

Multi-arm or star polymers can be generated using initiators capable of initiating multiple free radical polymerizations under the controlled conditions of the invention. Such initiators include, for example polyfunctional chain transfer agents, discussed in U.S. Pat. No. 6,380,335, the contents of which are incorporated by reference. Following initiation, the growth of each arm is controlled by the same living kinetics described for linear polymers, making it possible to assemble star polymers whose arms include individual homopolymers as well as di, tri or higher order coplymers or block copolymers. Alternatively, multi-arm polymers are formed by growing end-functionalized oligomers or polymers followed by the addition of a cross-linking monomer such as ethylene glycol diacrylate, divinyl benzene, methylene bisacrylamide, trimetylol propane triacrylate, etc. The small hydrodynamic volume of star polymers produced according to these methods provides properties such as low viscosity, high $M_w$, and high functionality useful in applications such as rheology control, thermosets, and separation media. Similarly, the inclusion of branched or multiple ethylenically unsaturated monomers enables the preparation of graft polymers, again exhibiting the living kinetics characteristic of this invention. The existence of a block copolymer according to this invention is determined by methods known to those of skill in the art, including nuclear magnetic resonance (NMR), measured increase of molecular weight upon addition of a second monomer to chain-extend a living polymerization of a first monomer, microphase separation (e.g., long range order, microscopy and/or birefringence measurements), mechanical property measurements, (e.g., elasticity of hard/soft block copolymers), thermal analysis and chromatography (e.g., absence of homopolymer).

In some embodiments, the resulting polymers described above will have one or more termini having a thio group, specifically a thiocarbonylthio group. Depending on the application intended for the polymer, the thio group may be undesirable. Thus, this invention provides a method for removing and/or replacing the group.

After the polymerization (e.g., completed or terminated) the residual thio-moiety (e.g., a thiocarbonylthio moiety) of the CTA can be cleaved by chemical or thermal ways in order to reduce the sulfur content of the polymer and prevent possible problems associated with presence of the chain transfer agents chain ends, such as odor or discoloration. In one embodiment, it is preferable to remove any residual monomer remaining in the mixture before cleaving the CTA. Specifically, there should be less than 20%, more specifically, less than 10%, even more specifically, less than 5%, and even more specifically, less than 2% of total residual monomer remaining in the system compared to the polymer by weight.

Thus, the reactive thiocarbonyl or thiophosphoryl group that is present at the end of the chain in the resulting polymer as used in the procedure according to the invention, may comprise a -D(C=S)-Z group or an -D(P=S)-Z group, where D and Z are as defined above Some specific embodiments of Z are shown herein, and in addition include perfluorenated aromatic rings, such as perfluorophenyl.

In embodiments described above, the resulting polymer contains a CTA moiety (a portion of the chain transfer agent, such as the dithio carbonyl portion) at a terminal end, whether the end is at the end of a backbone, a star arm, a comb end, a branch end, or a graft. Mechanistically, a free radical chain transfer reaction is believed to decouple a residue, such as the dithio CTA moiety, from the polymer end by addition of an external radical source, such as an initiator, and a monomer with little or no homopolymerizability, or a monomer that does not substantially homopropagate under free radical polymerization conditions. The polymer chain is then capped with either an initiator fragment radical or an initiator fragment-monomer radical.

By "little to no homopolymerizability" and "does not substantially homopropagate" it is meant that the propagation rate constant, $k_p$ (L/mol/sec.) of the monomer is less than 2000, specifically less than 1000, more specifically less than 500, and more specifically less than 300.

Wishing not to be bound to any particular theory, it is thought the cleavage of the thio group from the polymer proceeds through a set of reactions described below in Schemes 2, 3 and 4:

$$I_2 \rightarrow 2I\bullet \qquad \text{Scheme 2}$$

$$I\bullet + J \rightarrow I[J]_n\bullet \qquad \text{Scheme 3}$$

$$P-S-C(=S)-Z + I[J]_n\bullet \rightarrow P\bullet + I[J]_n S-C(=S)-Z \qquad \text{Scheme 4}$$

where P represents the polymer, C is carbon S is sulfur, 12 a free radical source, J is a monomer with little or no homopolymerizability, n is a number between 1 and 10, specifically between 1 and 5, and more specifically between 1 and 3, I• is a free radical stemming from 12 decomposition, I[J]$_n$• is a free radical stemming from the combination of the initiator radical and the monomer J, and Z is as defined above. Scheme 2 represents the activation of the free radical initiator yielding radical I•; Scheme 3 represents the creation of a radical resulting form the addition of the monomer with little or no homopolymerizability and the radical generated by the free radical initiator; and Scheme 4 represents the addition-fragmentation of I[J]$_n$• on the dithio-terminated polymer generating a polymer radical P•.

In some embodiments, the external radical source is a common radical initiator, such as any initiator listed above. Regardless of its exact nature, the free-radical source implemented in the procedure according to the invention is utilized under cleavage reaction conditions that allow for the production of free radicals, which, in one embodiment, is accomplished via thermal activation, i.e., by raising the temperature of the reaction medium, usually to a temperature in the range of about room temperature (approximately 20° C.) to about 200° C., and specifically from about 40° C. to about 180° C., and more specifically from about 50° C. to about 120° C. In other embodiments, free radicals are produced via light activation. This includes free radical sources activatable by UV light, such as benzoin ethers, and benzophenone. High energy radiations such as Gamma rays and electron beams are also known to produce radicals. In yet other embodiments, free radicals are produces via redox reaction of the free radical source with a reductant. Reductants include chemicals such as sodium formaldehyde sulfoxalate, sodium bisulfite, iron sulfate, dimethyl analine, etc.

The free-radical source utilized may be introduced into the reaction medium in one single increment. However, it may also be introduced gradually, either by portions or continuously.

The present invention is based on the use of monomers with little or no homopolymerizability, or monomers that do not homopropagate under free radical polymerization conditions (i.e. N-methylmaleimide) together with a radical source, in order to create a high energy radical that can successfully cleave thio moieties from certain polymers which require a high energy radical for cleavage, such as polyacrylates. A high-energy radical is produced when a radical formed by the thermal fragmentation of a radical source, e.g., AIBN, adds to the non-homopolymerizable monomer. It is believed that the radical formed then adds to the CTA, liberating the polymer radical which combines with other radicals present in the reaction. As a result of this reaction, the CTA free polymer product contains about 1 to 10 units of the monomer with little or no homopolymerizability and a group from the radical source.

Monomers contemplated for use within this invention include maleimide, N-substituted maleimides, (including but not limited to, N-phenylmaleimide, N-methylmaleimide, N-ethylmaleimide, N-benzylmaleimide, N-propylmaleimide, N-(4-ethylphenyl)maleimide, N-(4-acetylphenyl) maleimide, N-(para-tolyl)-maleimide, N-cyclohexyl maleimide N-dodecyl maleimide, N-tert-butyl maleimide, N-isopropyl maleimide, N-(2-hydroxyethyl) maleimide, and N-(3-hydroxypropyl) maleimide) maleic anhydride, maleic acid, fumaric acid, maleic esters (including but not limited to, di-n-butyl maleate, di-n-amyl maleate, diethyl maleate, diisoamyl maleate, dimethyl maleate, diphenyl maleate, and di-n-propylmaleate), fumaric esters (including but not limited to, di-n-amyl fumarate, diethyl fumarate, diisoamyl fumarate, diisobutyl fumarate, diisopropyl fumarate, dimethyl fumarate, diphenyl fumarate, and di-n-propyl fumarate), allyl and methallyl compounds, (suchs as (meth)allylsulfonate, (meth)allylglycidylether, (meth)alkylvinylether, (meth)allylbutyl ether, (meth)allylethyl ether, and (meth)allylmethyl ether), vinyl ethers, vinyl sulphonates, vinyl phosphonates, 1,3-butadiene derivatives, itaconic acid derivatives (including but not limited to, di-n-butyl ester, diethyl ester, dimethyl ester and dicyclohexyl ester), α-alkylstyrene, α-ethylacrylate, cis and trans stilbene, and other monomers which are notoriously slow polymerizing. This invention also allows for the possibility for a wide range of chain end fuctionalization of polymers prepared by RAFT polymerization.

The cleavage reaction conditions that may be used include conditions such as temperature, pressure, atmosphere, reaction times and ratios of reaction components. Temperatures useful are those in the range of from about room temperature (approximately 20° C.) to about 200° C., and specifically from about 40° C. to about 180° C., and more specifically from about 50° C. to about 120° C. In some embodiments, the atmosphere may be controlled, with an inert atmosphere being preferred, such as nitrogen or argon. In other embodiments, ambient atmosphere is used. The cleavage reaction conditions also include open or closed atmospheres and pressures at ambient conditions. In embodiments in which the cleavage reaction is carried out in a closed atmosphere, and the temperature is above room temperature, the pressure could rise as a result of any heated solvents. In some embodiments light control is also desired. Specifically, the reaction may be carried out in visible light, or under UV light. In other embodiments additional reagents may be added which will undergo a redox reaction with the radical source.

The quantity of the free-radical source depends on its effectiveness, on the manner in which the source is introduced, and in the desired end product. In some embodiments, complete removal or as near as complete as possible is desired and in those embodiments, an excess of free radical source is introduced.

Cleavage reaction conditions include, in addition to those reaction conditions discussed above, a molar ratio of monomer with little or no homopolymerizability to dithio end groups between 0.5:1 and 10:1, and more specifically between 1.0:1 and 5:1, and more specifically from 1.5:1 to 3:1, and a mole ratio of free radical initiator to dithio end groups of between 0.01:1 to 8:1, more specifically between 0.2:1 to 5:1, and more specifically between 1:1 to 4:1.

The excess free radical source is intended to account for the side reactions that are well known in free radical processes as shown below (for example in Scheme 8), as well as the possible free radical loss caused by the cage effect. When available, the free radical source efficiency factor, f, defined as the ratio of active radicals to total radicals generated upon free radical source decomposition, can be used to adjust the concentration of initiator ($I_2$).

Most known free radical sources can be used, as long as the half-life time (defined as the time after which half of the free radical source has been consumed) is between approximately 10 minutes and 20 hours.

Typical initiators that can be used as a free radical source are selected among alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, alkyl peracids, substituted alkyl peracids, aryl peracids, substituted aryl peracids, dialkylperdicarbonate, inorganic peroxides, hyponitrites and azo compounds. Specific initiators include lauroyl and benzoylperoxide (BPO), Dimethyl 2,2'-azobis(isobutyrate), and AIBN. Some preferred azo compounds include 1,1'-Azobis(cyclohexane-1-carbonitrile), 2,2'-Azobis(4-methoxy-2,4-dimethyl valeronitrile), Dimethyl 2,2'-azobis(2-methylpropionate), 1-[(cyano-1-methylethyl)azo] formamide, 2,2'-Azobis(N-cyclohexyl-2-methylpropionamide), 2,2'-Azobis(2,4-dimethyl valeronitrile), 2,2'-Azobis(2-methylbutyronitrile), 2,2'-Azobis[N-(2-propenyl)-2-methylpropionamide], 2,2'-Azobis(N-butyl-2-methylpropionamide), 2,2'-Azobis[2-(5-methyl-2-imidazolin-2-yl)propane]dihydrochloride, 2,2'-Azobis[2-(2-imidazolin-2-yl)propane disulfate dihydrate, 2,2'-Azobis[N-(2-carboxyethyl)-2-methylpropionamidine] tetrahydrate, 2,2'-Azobis{2-[1-(2-hydroxyethyl)-2-imidazolin-2-yl]propane}dihydrochloride, 2,2'-Azobis{2-methyl-N-[1,1-bis(hydroxymethyl)-2-hydroxyethyl] propionamide, 2,2'-Azobis[2-methyl-N-(2-hydroxyethyl) propionamide], 2,2'-Azobis[2-(2-imidazolin-2-yl)propane] dihydrochloride, 2,2'-Azobis(2-methylpropionamide) dihydrochloride, 2,2'-Azobis[2-(3,4,5,6-tetrahydropyrimidin-2-yl)propane]dihydrochloride, 2,2'-Azobis[2-(2-imidazolin-2-yl)propane], and 2,2'-Azobis{2-methyl-N-[2-(1-hydroxybuthyl)]propionamide}. This includes initiators activatable by UV such as benzoin ethers, and benzophenone. Other initiators are activatable by high energy such as gamma rays and electron beams. The half-life time can be adjusted by setting the reaction temperature to the required range. The latter is determined by the temperature dependence of the initiator decomposition rate, available through the supplier information package or in the literature (e.g. "The Chemistry of Free Radical Polymerization, G. Moad, D. H. Salomon, Eds. Pergamon Pub. 1995). The rate of decomposition, hence the radical production, is also adjustable by the addition of reducing agents, in particular when the initiator has an oxidizing character, such as peroxides: for instance metabisulfite, ascorbic acid, sulfite-formaldehyde adduct, amines, and low oxidation state metals, etc., can be used together with peroxides type initiators to accelerate the radical flux.

Cleavage reaction conditions also include the time for reaction, which may be from about 0.5 hours to about 72 hours, preferably in the range of from about 1 hour to about 24 hours, more preferably in the range of from about 2 hours to about 12 hours. Cleavage of thio group from the polymer is at least about 50%, more specifically at least about 75% and more specifically at least about 85%, and even more specifically at least about 95%. Replacement of the thio groups with groups other than hydrogen is at least about 50%, more specifically at least about 75% and more specifically at least about 85%, and even more specifically at least about 95%. The cleavage reaction mixture may use a reaction media that is typically a solvent. Cleavage reaction conditions also include stirring or refluxing the reaction media.

Wishing not to be bound to any particular theory, it is thought the resulting polymer radical, P•, can then be capped in one of seven ways as shown below in Schemes 5–8:

| P•+I•→P—I | Scheme 5 |
| P•+I[J]$_n$•→P-[J]$_n$I | Scheme 6 |
| P•+J→P-J• | Scheme 7 |
| P-J•+I•→PJI | Scheme 7.1 |
| P-J•+I[J]$_n$•→P[J]$_{n+1}$I | Scheme 7.2 |
| P-J•+P-J•→PJJP | Scheme 7.3 |
| P-J•+P•→P-J-P | Scheme 7.4 |
| P-J•+J→PJJ• | Scheme 7.5 |
| P•+P•→P—P | Scheme 8 |

Scheme 5 represents the radical coupling of the polymer radical generated in Scheme 4 and the free radical generated in Scheme 2, which produces the resulting capped polymer P—I. Scheme 6 represents the radical coupling of the polymer radical generated in Scheme 4 and the free radical generated in Scheme 3, which produces the resulting capped polymer P-[J]$_n$I. Scheme 7 represents the addition of the polymer radical generated in Scheme 4 with a monomer unit J, resulting in a new radical P-J• which is believed to react according to Schemes 7.1–7.4. Scheme 7.1 represents the radical coupling of the polymer radical generated in Scheme 7 and the free radical generated in Scheme 2, which produces the resulting capped polymer PJI. Scheme 7.2 represents the radical coupling of the polymer radical generated in Scheme 7 and the free radical generated in Scheme 3, which produces the resulting capped polymer P[J]$_{n+1}$I. Scheme 7.3 represents a coupling reaction between two polymer radicals generated in Scheme 7. Scheme 7.4 represents a coupling reaction between the polymer radical generated in Scheme 7 and the polymer radical generated in Scheme 4. Scheme 7.5 represents the further addition of monomer J to the radical generated in Scheme 7, resulting in a new radical PJJ•, which can go on to react as described above. Scheme 8 represents a coupling reaction between two polymer radicals generated in Scheme 4.

In one embodiment, Schemes 5, 6, 7.1 and 7.2 are the desired reactions. Schemes 7.3, 7.4 and 8 are side reactions that contribute to increasing molecular weight and broadening molecular weight distribution of the bulk polymer sample. It has been found that the described cleavage reaction conditions lead to quantitative cleavage of the dithiocompounds with little to no change in molecular weight characteristics (Mw and polydispersity index).

In one embodiment, the polymer is treated with a free radical source, such as an initiator, and a monomer with little or no homopolymerizability, under cleavage reaction conditions so that the reactions 7.3, 7.4 and 8 are favored. These conditions include introducing the radical source and the monomer with little or no homopolymerizability in a quantity such that the amount of free radicals containing one or more units of the monomer is between about 100% and about 800% (molar), and specifically between about 200% and about 500% (molar) in relation to the total molar amount of the groups in the polymers for which cleavage is desired.

The resulting polymer has a new group at its terminus, which may make the polymer more desirable for specific applications. For example, the polymer above may be more desirable for applications that cannot allow the presence of sulfur in the amounts present in the polymer before modification, such as home and personal care products where odor may present a problem, or electronics, where color may present a problem.

EXAMPLES

Preparation of a Polymer with a Composition (~55%) NLA (6-[5-hydroxynorbornane-2-carboxylic acid lactone] acrylate), (~35%) EADA (2-[2-ethyladamantyl]acrylate) and (~10%) HADA (1-[13-hydroxyadamantyl]acrylate) and Mw Targeted at 15000 g/mol at 100% Conversion.

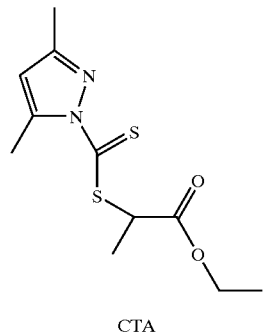

CTA

Stock Solutions (ss) are:
1) "Monomer Mixture": 20.95 g NLA+18.86 g EADA+4.47 g HADA+110 mL MEK
2) "MAIB Solution": 0.636 g 2,2'-dimethylazobis (methylpropionate) (MAIB)+15 mL MEK
3) "CTA Solution": 0.763 g CTA+3.79 mL MEK
4) "MEK" (pure): 91 mL MEK
Reaction:
5) A 500 mL glass reaction flask equipped with a magnet stir bar and a reflux condenser was cycled into the glove box.
6) All of "CTA Solution", and all of the "MEK" were added to the reaction flask, as well as 0.461 mL of "MAIB Solution" and 15.0 mL of "Monomer Mixture" (10% of each of these solutions).
7) The reaction flask was then removed from the glove box and the mixture was degassed by three freeze-pump-thaw cycles, followed by backfilling of the system with high purity nitrogen or argon (and left under a bubbler of inert gas).
8) The "Monomer Mixture" and "MAIB Solution" were then primed on two feed pumps which were then attached to the reaction flask. (The sealed bottles of the two stock solutions were placed under inert gas bubbler.)
9) The flask was the submerged into an oil bath at 70° C. and stirring was set at 400 rpm.
10) Once the reaction mixture reached 65° C., the semicontinuous addition of 135 mL of "Monomer Mixture" and 4.145 mL of "MAIB Solution" was begun, and added over the next three hours in a series of 100 equal volume injections while maintaining an internal temperature of 65° C.
11) Heating of the reaction mixture at 65° C. was continued for an additional three hours past the end of the feed.
12) The reactor was then cooled to room temperature (approximately 45–50 minutes) and the reaction mixture was precipitated slowly into 2 L of isopropanol, washed with an additional 500 mL of isopropanol, and dried under vacuum at 45° C. for two days.

13) 26 g of dry polymer was isolated with an Mw=6900, and a PDI=1.35 (sample 11692711 (A4)). Other samples were prepared in similar fashion with an isolation of polymer ranging from 0.5 grams to 50 grams yield after precipitation.

Removal of the thiocarbonylthio End Group Using N-methylmaleimide and AIBN

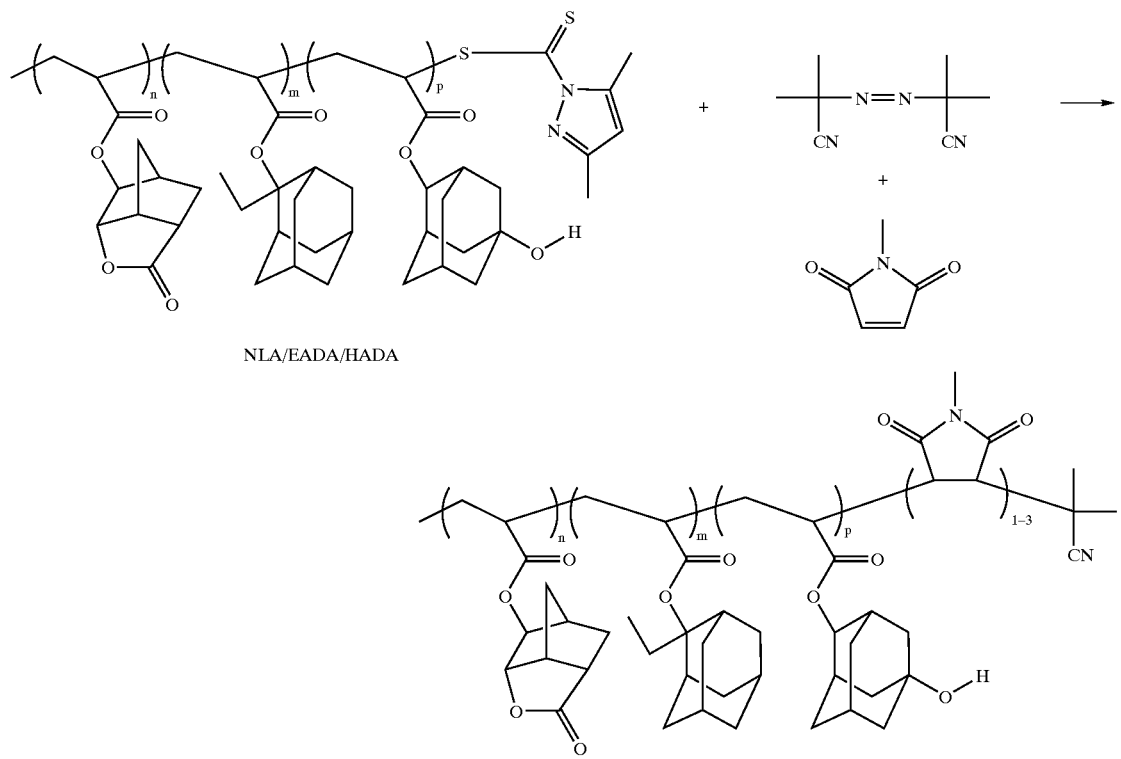

NLA/EADA/HADA

In a round bottom flask, 0.5 gr of the random copolymer synthesized above composed of (~55%) NLA (6-[5-hydroxynorbornane-2-carboxylic acid lactone] acrylate), (~35%) EADA (2-[2-ethyladamantyl] acrylate) and (~10%) HADA (1-[3-hydroxyadamantyl] acrylate) (0.072 mmol, Mw=6900, PDI=1.35) was dissolved in 5 ml of methylethylketone. AIBN (0.29 mmol, 47 mg) and N-methylmaleimide (0.29 mmol, 29 mg) were added to the solution. The solution was degassed and set to reflux for 2 hr. The reaction mixture was cooled down to room temperature, and was added drop by drop to a beaker containing isopropanol while stirring. The white polymer was precipitated. After filtration, the polymer was dried under vacuum until all the isopropanol was eliminated. GPC analysis of the white polymeric product showed elimination of UV absorption without appreciable change in Mw and polydispersity.

Removal of the thiocarbonylthio End Group Using N-phenylmaleimide and Dimethyl 2,2'-azobis(isobutyrate)

In a round bottom flask, 0.3 gr of the random copolymer synthesized above composed of ~55% NLA (6-[5-hydroxynorbornane-2-carboxylic acid lactone]acrylate), ~35% EADA (2-[2-ethyladamantyl]acrylate) and ~10% HADA (1-[3-hydroxyadamantyl] acrylate) (0.043 mmol, Mw=6900, PDI=1.35) was dissolved in 3 ml of methylethylketone. Dimethyl 2,2'-azobis(isobutyrate) (0.17 mmol, 40 mg) and N-phenylmide (0.17 mmol, 30 mg) were added to the solution. The solution was degassed and set to reflux for 2 hours. The reaction mixture was cooled down to room temperature, and was added drop by drop to a beaker containing isopropanol while stirring. The white polymer precipitated and was filtered. After filtration the polymer was dried under vacuum until all the isopropanol was eliminated. GPC analysis of the white polymeric product showed elimination of UV absorption without appreciable change in Mw and polydispersity. The $^1$H-NMR spectrum of the product showed an average incorporation of 2.5 molecules of N-phenylsuccinimide per polymer chain.

Preparation of poly-n-butylacrylate

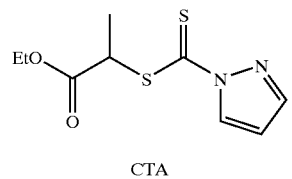

CTA

In a reaction vessel n-butyl acrylate (3 gr, 7.81 mmol), CTA (57 mg, 0.23 mmol) and AIBN (7.55 mg, 0.046 mmol) were combined. The reaction was degassed and heated at 60 C for 4 hr while stirring. After cooling to room temperature, the mixture was dissolved in 5 ml of THF and precipitated in hexane. GPC data showed a Mw=12900 and PDI=1.31.

Removal of the thiocarbonylthio End Group from poly-n-butylacrylate Using N-phenylmaleimide and AIBN In a round bottom flask, 0.5 gr of the poly-n-butylacrylate polymer synthesized above (0.039 mmol, Mw=12900, PDI=1.31) was dissolved in 5 ml of methylethylketone. AIBN (0.16 mmol, 26 mg) and N-phenylmaleimide (0.16 mol, 28 mg) were added. The solution was degassed and set to reflux for 2 hours. The reaction mixture was cooled down to room temperature, and was added drop by drop to a beaker containing MeOH/water 95/5 while stirring. A clear oil was observed. After decantation the polymer was dissolved in dichloromethane, dried with magnesium sulphate and concentrated. GPC analysis of the product showed elimination of UV absorption, with Mw=13900 and PDI=1.12. The $^1$H-NMR spectrum of the product showed an average incorporation of 1.5 molecules of N-phenylsuccinimide per polymer chain.

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A method of free radical polymerization comprising (1) forming a mixture of one or more monomers, at least one free radical source and a chain transfer agent, wherein the chain transfer agent comprises a thio group; (2) subjecting the mixture to polymerization conditions, wherein a resulting polymer comprises thio groups; (3) contacting the resulting polymer with a free radical source and a monomer having a propagation rate constant ($k_p$) less than 2000 under cleavage reaction conditions; and (4) activating the free radical source to generate radicals, wherein at least 50% of the thio groups are replaced with a group of interest other than hydrogen.

2. The method of claim 1, wherein the monomer contacting the resulting polymer has a $k_p$ of less than 1000.

3. The method of claim 1, wherein the monomer contacting the resulting polymer has a $k_p$ of less than 500.

4. The method of claim 1, wherein the monomer contacting the resulting polymer with has a $k_p$ of less than 300.

5. The method of claim 1, wherein the free radical source is introduced continuously throughout the cleavage reaction.

6. The method of claim 1, wherein the monomer with a $k_p$ less than 2000 is selected from the group consisting of maleimide, N-substituted maleimides, maleic anhydride, maleic acid, fumaric acid, maleic esters, fumaric esters, allyl and methallyl compounds, vinyl ethers, vinyl sulphonates, vinyl phosphonates, 1,3-butadiene derivatives, itaconic acid, α-alkylstyrene, α-ethylacrylate, cis and trans stilbene, and combinations thereof.

7. The method of claim 1, wherein the monomer with a $k_p$ less than 2000 is selected from the group consisting of maleimide, N-phenylmaleimide, N-methylmaleimide, N-ethylmaleimide, N-benzylmaleimide, N-propylmaleimide, N-(4-ethylphenyl)maleimide, N-(4-acetylphenyl) maleimide, N-(para-tolyl)-maleimide, N-cyclohexyl maleimide N-dodecyl maleimide, N-tert-butyl maleimide, N-isopropyl maleimide, N-(2-hydroxyethyl) maleimide, N-(3-hydroxypropyl) maleimide, di-n-butyl maleate, di-n-amyl maleate, diethyl maleate, diisoamyl maleate, dimethyl maleate, diphenyl maleate, and di-n-propylmaleate, di-n-amyl fumarate, diethyl fumarate, diisoamyl fumarate, diisobutyl fumarate, diisopropyl fumarate, dimethyl fumarate, diphenyl fumarate, di-n-propyl fumarate, (meth)allylsulfonate, (meth)allylglycidylether, (meth)alkylvinylether, (meth)allylbutyl ether, (meth) allylethyl ether, (meth)allylmethyl ether, and combinations thereof.

8. The method of claim 1, wherein the monomer with a $k_p$ less than 2000 is selected from the group consisting of N-phenylmaleimide, N-methylmaleimide, N-ethylmaleimide, N-benzylmaleimide, N-propylmaleimide, and combinations thereof.

9. The method of claim 1, wherein at least one of the one or more monomers in the monomer mixture is an acrylate.

10. The method of claim 1, wherein all of the monomers in the monomer mixture are acrylates.

11. The method of claim 1, wherein cleavage reaction conditions comprise a molar ratio of between 0.5:1 and 10:1 for the monomer having a $k_p$ less than 2000 to the thio groups in the polymers for which cleavage is desired.

12. The method of claim 1, wherein cleavage reaction conditions comprise a molar ratio of between 1.0:1 and 5:1 for the monomer having a $k_p$ less than 2000 to the thio groups in the polymers for which cleavage is desired.

13. The method of claim 1, wherein cleavage reaction conditions comprise a molar ratio of between 1.5:1 to 3:1 for the monomer having a $k_p$ less than 2000 to the thio groups in the polymers for which cleavage is desired.

14. A polymer formed by the method of claim 1.

15. The polymer of claim 14, wherein said polymer is a block copolymer.

16. The polymer of claim 14, wherein said polymer is a random copolymer.

17. The method of claim 1, wherein at least 85% of the thio groups are replaced with a moiety comprising the radicals generated in step (4).

18. The method of claim 1, wherein at least 95% of the thio groups are replaced with a moiety comprising the radicals generated in step (4).

19. A method of cleaving at least a portion of a thiocarbonylthio group from an end of a polymer, the method comprising forming a mixture of the polymer, at least one free radical source, and a monomer with propagation rate constant ($k_p$) less than 2000, and subjecting the mixture to cleavage reaction conditions.

20. The method of claim 19, wherein the source of free radicals is selected from the group consisting of peroxides, hydroperoxides, peresters, peracids, percarbonates and azo compounds.

21. The method of claim 19, wherein an additional reagent is added which interacts in a redox reaction with the free radical source to liberate radicals.

22. The method of claim 19, wherein cleavage reaction conditions comprise a molar ratio of between 0.5:1 and 10:1 for the monomer having a $k_p$ less than 2000 to the thio groups in the polymers for which cleavage is desired.

23. The method of claim 19, wherein cleavage reaction conditions comprise a molar ratio of between 1.0:1 and 5:1 for the monomer having a $k_p$ less than 2000 to the thio groups in the polymers for which cleavage is desired.

24. The method of claim 19, wherein cleavage reaction conditions comprise a molar ratio of between 1.5:1 to 3:1 for the monomer having a $k_p$ less than 2000 to the thio groups in the polymers for which cleavage is desired.

25. The method of claim 19, wherein the monomer has a $k_p$ less than 1000.

26. The method of claim 19, wherein the monomer has a $k_p$ less than 500.

27. The method of claim 19, wherein the monomer has a $k_p$ less than 300.

28. The method of claim 19, wherein the monomer with a $k_p$ less than 2000 is selected from the group consisting of maleimide, N-substituted maleimides, maleic anhydride, maleic acid, fumaric acid, maleic esters, fumaric esters, allyl and methallyl compounds, vinyl ethers, vinyl sulphonates, vinyl phosphonates, 1,3-butadiene derivatives, itaconic acid, α-alkylstyrene, α-ethylacrylate, cis and trans stilbene, and combinations thereof.

29. The method of claim 19, wherein the monomer with a $k_p$ less than 2000 is selected from the group consisting of maleimide, N-phenylmaleimide, N-methylmaleimide, N-ethylmaleimide, N-benzylmaleimide, N-propylmaleimide, N-(4-ethylphenyl)maleimide, N-(4-acetylphenyl) maleimide, N-(para-tolyl)-maleimide, N-cyclohexyl maleimide N-dodecyl maleimide, N-tert-butyl maleimide, N-isopropyl maleimide, N-(2-hydroxyethyl) maleimide, N-(3-hydroxypropyl) maleimide, di-n-butyl maleate, di-n-amyl maleate, diethyl maleate, diisoamyl maleate, dimethyl maleate, diphenyl maleate, and di-n-propylmaleate, di-n-amyl fumarate, diethyl fumarate, diisoamyl fumarate, diisobutyl fumarate, diisopropyl fumarate, dimethyl fumarate, diphenyl fumarate, di-n-propyl fumarate, (meth)allylsulfonate, (meth)allylglycidylether, (meth)alkylvinylether, (meth)allylbutyl ether, (meth)allylethyl ether, (meth)allylmethyl ether, and combinations thereof.

30. The method of claim 19, wherein the monomer with a $k_p$ less than 2000 is selected from the group consisting of N-phenylmaleimide, N-methylmaleimide, N-ethylmaleimide, N-benzylmaleimide, N-propylmaleimide, and combinations thereof.

31. The method of claim 19, wherein said polymer is a block copolymer.

32. The method of claim 19, wherein the polymer is a random copolymer.

33. The method of claim 19, wherein at least 85% of the thio groups are replaced with a moiety other than hydrogen.

34. The method of claim 19, wherein at least 95% of the thio groups are replaced with a moiety other than hydrogen.

35. The method of claim 19, wherein the free radical source is introduced continuously throughout the cleavage reaction.

36. A method of free radical polymerization comprising (1) forming a mixture of one or more acrylate monomers, at least one free radical source and a chain transfer agent, wherein the chain transfer agent comprises a thiocarbonylthio group; (2) subjecting the mixture to polymerization conditions, wherein a resulting polymer comprises thiocarbonylthio groups; and (3) contacting the resulting polymer with a free radical source and a monomer having a propagation rate constant ($k_p$) less than 2000 under cleavage reaction conditions.

37. The method of claim 36, wherein the monomer having a $k_p$ less than 2000 is selected from the group consisting of N-phenylmaleimide, N-methylmaleimide, N-ethylmaleimide, N-benzylmaleimide, N-propylmaleimide, and combinations thereof.

38. The method of claim 36, wherein the free radical source is an initiator.

* * * * *

UNITED STATES PATENT AND TRADEMARK OFFICE
CERTIFICATE OF CORRECTION

PATENT NO. : 6,919,409 B2
DATED : July 19, 2005
INVENTOR(S) : Charmot et al.

It is certified that error appears in the above-identified patent and that said Letters Patent is hereby corrected as shown below:

Title page,
Item [56], References Cited, FOREIGN PATENT DOCUMENTS,
"WO 98/10478  1/1998 .....C08F/2/38" should be corrected to be -- WO 98/01478 1/1998 .....C08F/2/38 --.

Column 25,
Line 39, delete "with" between "polymer" and "has".

Signed and Sealed this

Sixth Day of September, 2005

JON W. DUDAS
*Director of the United States Patent and Trademark Office*